United States Patent [19]

Miller

[11] Patent Number: 4,641,302
[45] Date of Patent: Feb. 3, 1987

[54] HIGH SPEED PACKET SWITCHING ARRANGEMENT

[75] Inventor: William J. Miller, North Miami, Fla.

[73] Assignee: Racal Data Communications Inc., Sunrise, Fla.

[21] Appl. No.: 748,255

[22] Filed: Jun. 24, 1985

[51] Int. Cl.⁴ .............................................. H04J 6/00
[52] U.S. Cl. .................................................... 370/60
[58] Field of Search ................ 370/60, 94; 340/825.52

[56] References Cited

U.S. PATENT DOCUMENTS

| | | | |
|---|---|---|---|
| 3,562,802 | 3/1972 | Schellenberg | 370/84 |
| 3,639,693 | 2/1972 | Bartlett et al. | 370/84 |
| 3,647,949 | 3/1972 | Closs et al. | 370/92 |
| 3,652,800 | 3/1972 | Dooley | 370/84 |
| 3,781,818 | 12/1973 | Pardoe et al. | 370/84 |
| 3,922,494 | 11/1975 | Cooper et al. | 370/84 |
| 4,071,706 | 1/1978 | Warren | 370/86 |
| 4,079,209 | 3/1978 | Schwerdtel | 370/60 |
| 4,081,612 | 3/1978 | Hafner | 370/60 |
| 4,314,367 | 2/1982 | Bakka et al. | 370/60 |
| 4,320,520 | 3/1982 | Graham | 370/84 |
| 4,347,498 | 8/1982 | Lee et al. | 370/60 |
| 4,380,063 | 4/1983 | Janson et al. | 370/60 |
| 4,399,531 | 8/1983 | Grande et al. | 370/60 |
| 4,443,875 | 4/1984 | Blausten | 370/60 |
| 4,494,230 | 1/1985 | Turner et al. | 370/60 |
| 4,499,576 | 2/1985 | Fraser | 370/60 |
| 4,577,311 | 3/1986 | Duquesne et al. | 370/60 |

Primary Examiner—Douglas W. Olms
Assistant Examiner—Kenneth I. Rokoff
Attorney, Agent, or Firm—Jerry A. Miller

[57] ABSTRACT

A circuit arrangement is provided for switching serial data packets through a network destined for one of a plurality of possible outgoing lines. Minimal delay is achieved by shifting the data through a shift register having length equivalent to the destination address of the incoming serial data packet. The shift register addresses a memory which in turns controls a switch network so that the incoming packet is switched with minimal delay to an appropriate outbound line. By utilizing random access memory to translate from destination address to switch position, the system may be altered to correct for changes in the overall network caused by network failures or expansion network or to allow dynamic load balancing by directing data through the switch to a control computer which in turn rewrites the memory.

9 Claims, 4 Drawing Figures

HIGH SPEED PACKET SWITCHING ARRANGEMENT

BACKGROUND OF THE INVENTION

1. Field of the Invention

This invention relates generally to the field of digital communications networks utilizing high speed packet switching. More particularly, this invention relates to a circuit arrangement for high speed packet switching suitable for minimizing delay in a network which switches voice packets.

2. BACKGROUND

A typical packet switching data communication network is made up of a number of nodes which are interconnected as shown in FIG. 1. The simple network of FIG. 1 includes nodes 10, 12, 14, 16, 18, and 20. Each node includes a number of input ports such as 22, 24, 26, 28, 30 32, 24, 26, and 38. Each node also includes a number of output ports 40, 42, 44, 46, 48, 50 and 52. The nodes are c onnected together by a plurality of links which may be wire transmission lines such as 60, 62, 64, 66, 68, 70, 72, 74 and 76. Such a network is suitable for bidirectional communication of data or voice information as is known in the art. In FIG. 1, only unidirectional communication paths are shown for clarity, but it is understood that for each input port there is a corresponding output port and vice versa.

Each node of the network is connected to one or more users of the network. Thus, packets flowing from node to node in the network may be destined for a variety of users, many of whom may be connected to a single node.

By way of example, if a packet enters input port 22 of node 10 destined for node 20, a number of possible paths may be taken to that node to form a virtual connection between node 10 and node 20. For example, the packet may flow from node 10 to node 12 and then on to its final destination node 20. It may also flow from node 10 to node 16 to node 18 to node 20. One skilled in the art will readily recognize that a number of possible paths may be utilized to complete the virtual circuit from node 10 to node 20. This is advantageous to provide network redundancy and allow for dynamic load allocation. Various techniques are known in the art for determining which route should be taken by the packet. Typically, a routing table is established by analyzing the statistical loading of the network. In the event of a failure in the network, the routing table may be modified so that different paths may be taken to avoid the failure. For example, if a packet destined for node 20 from node 10 normally is routed through node 12, a failure in trunk 62 can be dealt with by changing the routing table to send the packets to node 18 and then node 20. The routing table may also be modified continuously in order to accomplish dynamic load balancing. Of course, other routing techniques such as flood routing may be used.

In a normal packet switching network each node individually looks at incoming packets and analyzes them to determine which outbound port the packet should be transferred to. This can be a time consuming process using conventional technology. When the packets contain digitized voice, any significant delay passing through the node can result in unacceptable speech quality at the packet's final destination. It is therefore critical, especially in a system which handles voice packets, to reduce the delay encountered at each node to an acceptable level. This delay problem is one of the major problems encountered in packetizing voice.

In conventional packet switch systems, incoming packets may be stacked up in a large buffer for analysis by computer prior to being passed on to the next node. This technique may prove unacceptable for voice packets and even for data packets in a system which utilizes extreme high speed transmission of data over a media such as fiber optics. In such situations, it is advantageous to provide packet switching on an almost instantaneous basis as the packet is passing through the node. Otherwise, network congestion will occur unless the packets are processed at extremely high speed within each node. With transmission rates in the range of several gigabits per second, simple hardware which does not require detailed computer analysis or other slow techniques for routing packets is clearly desirable. By utilizing the techniques and hardware of the present invention, a cost effective solution to these and other problems may be realized.

SUMMARY OF THE INVENTION

It is an object of the present invention to provide an improved switching circuit for serial transmitted data.

It is another object of the present invention to provide a high speed switching circuit which introduces minimal delay to packets.

It is another object of the present invention to provide a switching arrangement for packetized voice.

It is yet a further object of the present invention to provide a cost effective switching arrangement for high speed data packet networks.

These and other objects of the invention will become apparent to those skilled in the art upon consideration of the following description of the invention. In one embodiment of the present invention a circuit arrangement for routing incoming serial data to one of a plurality of outgoing lines, wherein the incoming serial data includes a header containing an N bit address indicative of which one of said plurality of outgoing lines said data should be routed to includes a shift register having N stages and an input for receiving serial data and an output for providing shifted dta. A memory having a parallel address word input coupled to each of the N stages and a parallel memory output is coupled to a switching circuit for receiving the shifted output. The switching circuit is responsive to the parallel memory output for selecting one of a plurality of outgoing ports for transmission of the shifted data.

The features of the invention believed to be novel are set forth with particularity in the appended claims. The invention itself however, both as to organization and method of operation, together with further objects and advantages thereof, may be best understood by reference to the following description taken in conjunction with the accompanied drawings.

DETAILED DESCRIPTION OF THE PREFERRED EMBODIMENTS

Figure 2:
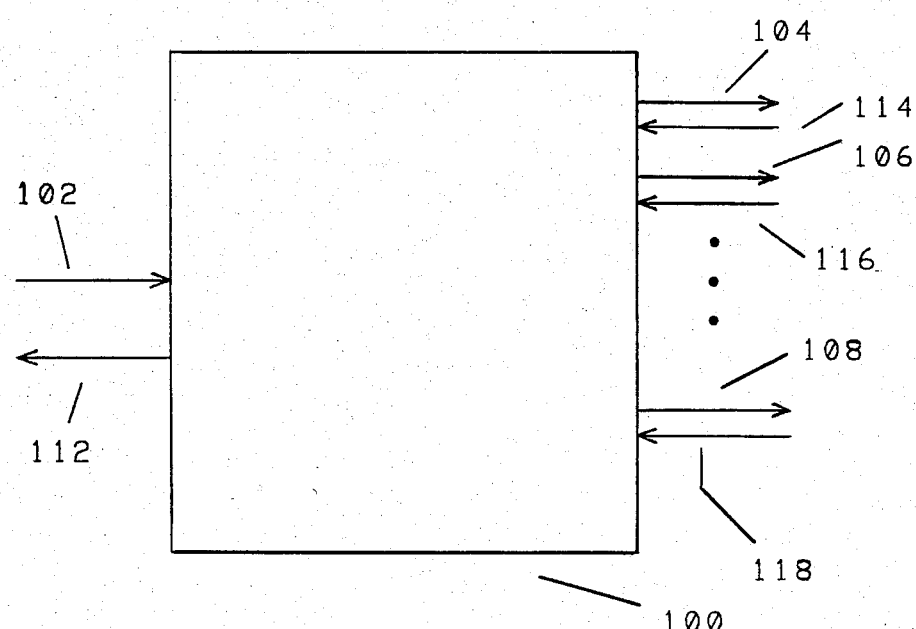
FIG. 2 represents a single node in a packet switch network according to the present invention.

Turning now to FIG. 2, a typical node of a packet switching network is shown and designated 100. Node 100 includes an input port 102 which may be selectively coupled to any of output ports 104, 106 through 108. In a preferred embodiment of the present invention any input may selectively be coupled to any of fifteen possible output ports, but this is not to be limiting since any number may be accommodated. Associated with input port 102 is an output port 112. Similarly, an output port 114, 116 through 118 is associated with each of input ports 104, 106 through 108. It would be understood by those skilled in the art that a switching circuit such as that of the present invention will be largely duplicated 16 times to form the complete switching hardware for node 100 of FIG. 2. It is also understood that node 100 may supply data to local users of the node through one or more of output ports 112, 114, 116 through 118.

Figure 1:
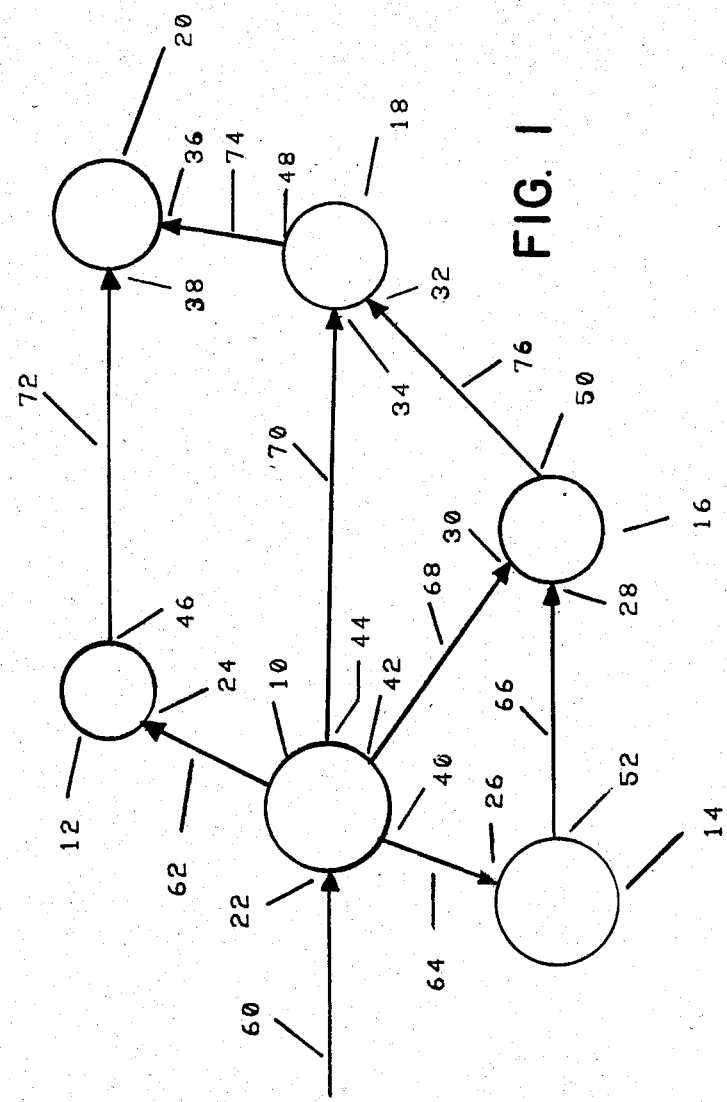
FIG. 1 is a diagram of a typical packet switching network.
Figure 3:
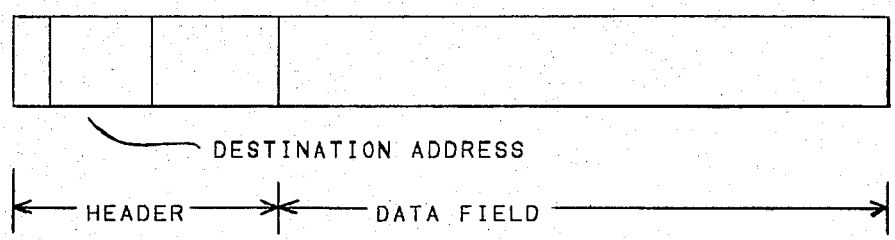
FIG. 3 illustrates a packet format which is acceptable for use with the present invention.

Node 100 is utilized to switch data packets or voice packets or other types of packets which take on the format shown generally in FIG. 3. In general, the basic requirement of the packets used in conjunction with the present invention is that each packet or group of packets include a header portion which contains a destination address indicative of a node to which the packet is ultimately destined. This is a normal condition for packetized communication networks. The header may also contain synchronization signals, system control bits or words, source address etc. In extremely high speed networks packets may be separated by a short time period to be determined by the individual needs of the system, to guard against overlap of packets. The header portion of the packet of FIG. 3 is assumed to include a synchronization word at the very beginning of the packet and will normally contain a data field which may contain binary data or digitized voice along with parity information, etc. In the preferred embodiment the destination address comprises a 12 bit binary word which allows up to 4,096 possible ultimate destinations. Of course the present invention is not limited to a system using a 12 bit destination address since in general an N bit destination address may be used to allow $2^N$ destinations. Also, the present invention is not limited to binary as shown but may be implemented in any selected logic system.

Figure 4:
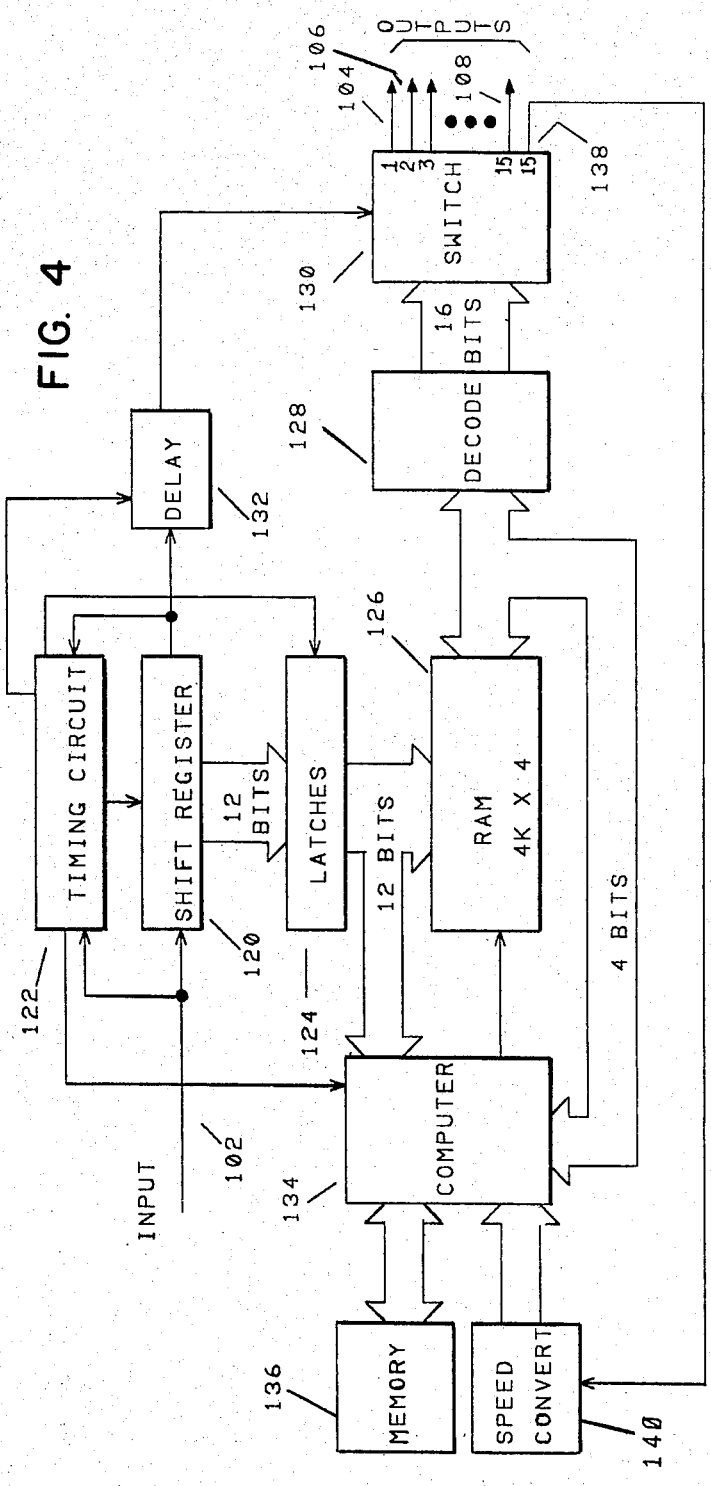
FIG. 4 shows a circuit embodiment of the present invention.

Turning now to FIG. 4, a block diagram of the present invention is show. Input 102 is coupled to a shift register 120 which is preferably, but not necessarily a 12 bit serial-in parallel-out shift register. Input 102 is also coupled to a timing circuit 122 which is used to recover clock information from the incoming data packets as well as to provide synchronization to the entire network of FIG. 4. Timing circuit 122 may also receive the shifted output of shift register 120 depending on the exact configuration of timing circuit 122. Timing circuit 122 applies a clocking signal to shift register 120 to allow the data to shift through shift register 120. Timing circuit 122 is also coupled to a set of 12 latches 124 which are also coupled to the 12 bit parallel output of shift register 120. Timing circuit 122 detects and/or signals the presence of a complete destination address in shift register 120 and strobes latches 124 in order to latch that destination address into latches 124. Techniques for implementing timing circuit 122 are well known to those skilled in the art. Timing circuit 122 may include but is not limited to phase-locked loop techniques and correlation techniques for extracting timing from the data. The outputs of latches 124 are coupled to the address inputs of a 4k by 4 bit RAM 126 in the preferred embodiment.

While the preferred embodiment utilizes a 4k by 4 bit random access memory so that the routing information for packets can be readily changed, one skilled in the art will recognize that various other forms of memory such as read only memory and electrically erasable read only memory may be suitable for use in particular variations of the present invention. Also, it is clear that different sizes and configurations of memory may be suitable for certain applications. For example, a 4K by 5 bit RAM may be more suitable if more than one output line may be elected at any one time as will become more evident in light of the following description. RAM 126 may also be coupled to timing circuit 122 as will be appreciated by those skilled in the art, to effect appropriate timing of the output of RAM contents when addressed by latches 124.

The four bit output of RAM 126 is coupled to a decoding circuit 128 which in the preferred embodiment is a binary to one of sixteen decoder which may select one of 16 possible output ports to be active for any particular four bit binary input. Of course, other embodiments may utilize any number of such output ports and may similarly use any appropriate decoder. Such decoders are similar to standard 1 of M decoders which are common circuit elements and well known in the art. The 16 bit output of decoder 128 selects 1 or more of 16 possible switches in a switch network 130 as output port for the circuit, one of which may be a local output.

Shift register 120 also has an output which is coupled, possibly through a delay network 132, to an input of switch network 130. Since in the preferred embodiment only binary data is passing through the network, switch network 130 may be as simple as an array of AND gates or OR gates which selectively allow binary data from the shift register to pass through them in accordance with known operation of such simple logic devices.

In operation, data packets or other serial data having a destination address enter input port 102 and are serially shifted through shift register 120 until shift register 120 contains a complete destination address. At that point, timing circuit 122 latches the destination address into latches 124 which in turn addresses a 12 bit RAM address for RAM memory 126. The four bit output of RAM 126 is decoded by decoder 128 to select 1 (or possibly more than one in an alternate embodiment) of switches 130. The serial output of the shift register 120 is passed through a delay 132 and then applied to the input of of switch network 130 and is selectively coupled by switch network 130 to one output port such as 104 of switch network 130. Depending upon the data rate and format of the incoming packets, delay circuit 132 may or may not be necessary. At lower data rates delay may not be necessary. At higher data rates such as those above approximately 50 megahertz the propagation delays, etc., associated with shift register 120, latches 124, RAM 126, decoder 128 and switches 130 may become significant factors in the overall speed with which the network can provide its switching function. In particular, the access time of RAM 126 may be significant. In these instances delay 132 should be set to appropriately account for these delays. Also, it should be noted that if the packet header contains information preceding the destination address, delay network 132 should delay the packet by an amount equivalent to the packet length before the destination address so that the beginning of the packet will reach switch 130 immediately after one of the switches of switch network 130 is set.

In many instances it may be desirable to provide the ability to reprogram RAM 126 so that a particular destination address ultimately results in a different output from switch 130 than that already present in RAM 126. This allows the network to be reprogrammed and optimized as a result of a node failure, other network failures, or to accommodate growth of the system or change to loading of the system. In order to accomplish this, a computer 134 may also access the output of latches 124 as well as the data output, write enable and address lines of RAM 126. Computer 134 has associated memory 136 which may include RAM and ROM memory as well and the ability to log activity through the network by reading the 12 bit output of the latches 124 and providing disk or hard copy storage of the information. One or more of the 4096 specific RAM addresses and therefore destination addresses may be set aside for use locally by the node in order to reprogram memory 126 as well as take care of other nertwork control functions.

When RAM 126 is to be reprogrammed, a data packet is loaded with an appropriate destination address to access a switch position which couples switch output 138 to a speed conversion network 140 which may also include serial to parallel conversion as well as other functions. In this manner the data in the packet is passed through switch 130 to speed converter 140 and on to computer 134. Computer 134 may then write or rewrite data to RAM 126 in order to change the RAM's look up table of destination addresses and switch positions. RAM 126 may be completely revised or initialized in this manner or only selected memory locations may be modified according to the immediate needs of the network.

It should be noted that in accordance with the present invention very high speed switching may be provided so that data packets may be shifted almost instantaneously as they pass through a node. By way of example, assume a 1,024 bit packet which consists of a 1 bit synchronization bit followed by a 12 bit destination address, a 12 bit source address, 7 system control bits, a 976 bit data or digitized voice field and 1 16 bit parity word. If these packets are transmitted at a 10 megabit per second rate, each bit is 100 nS in duration. By utilizing high speed industry grade emitter-coupled logic (ECL) for implementation of shift register 120, latches 124, RAM 126, decoder 128 and switch circuit 130, the total delay from the time the destination address arrives in shift register 120 until a switch 130 can be selected can be held below approximately 15 nS. Of course those skilled in the art will know that even higher speeds may be achieved with higher grade ECL or other known techniques. Relative to the 100 nS bit width, this delay is almost negligible. The delay required to accommodate the 1 bit synch bit so that it arrives at switch network 130 at an appropriate time is approximately 100 nanoseconds. Therefore, the total delay required in delay network 132 is approximately 0.115 microseconds. The total packet length on the other hand is 102.4 microseconds. Thus, in this example at 10 megabits per second bit rate, the packet is well on its way out of the node while only approximately 13 bits of 1,024 bit packet has entered the node. Total delay through the node may be as low as 1.315 Microseconds (allowing for the 12 bit shift register delay plus the one bit synchronization bit delay).

It is also interesting to note that shift register 120, timing circuit 132, switch circuit 130 and delay circuit 132 should operate at at least the data rate of the incoming packets. However, the bulk of the circuitry in latches 124, RAM 126 and decoder 128, as well as computer 134 and associated components may operate at a substantially lower speed, i.e., the packet rate or faster, thus reducing the cost of these components. In the above example, the packet rate is approximately 10,000 packets/second. Thus computer 134, RAM 126, etc., may operate at very manageable speeds while still providing for a reasonably rapid (10 MBPS) data rate.

One skilled in the art will recognize that the delays assumed in the above example are for typical high speed emmiter-coupled logic which is commercially available for example in the form of the MECL 10KH TM series logic from Motorola ®, Inc. Significantly higher speeds may be obtained by utilizing liquid cooled and super cooled technologies and/or gallium arsenide technologies which can presently operate at speeds exceeding one Ghz.

By utilizing gallium arsenide technology for the high speed circuits of the present invention, even extremely high speed fiber optic networks having data rates exceeding one gigabit per second may be achieved with total delays on the order of several nS. As even higher speed technologies evolve, the present circuit configuration will similarly provide relatively small delays for serial data passing through the network. As delays are minimized, even speech may be packetized without serious degradation of audio quality by utilizing the present invention.

In such high speed communication networks, the switching speed becomes even more critical. For example, if the same 1024 bit packet is transmitted at a bit rate of 1.0 GBPS the corresponding data bits are only 1.0 nanosecond in duration. The packet length is 1.024 microseconds so that only slightly more than one microsecond is available for each packet to do the necessary switching. In this example, the shift register must operate at one GBPS but the bulk of the circuitry may operate at a much more comfortable rate of only approximately one MBPS.

The present invention therefore provides a circuit arrangement which can rapidly switch packetized data through a node in a packet switching network. The speed which may be achieved results in the ability to transmit speech through a network with minimal delays, thereby allowing a system to provide packetized voice service along with all the advantages this implies to one skilled in the art including the mixture of voice along with data in a packet switching network.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A circuit arrangement for routing incoming serial data to one of a plurality of outgoing ports, wherein said incoming serial data includes a header containing an N bit address which can be associated with one of said plurality of M outgoing ports to which said data should be routed, said circuit arrangement comprising:

a shift register having N stages and an input for receiving said serial data and an output for providing shifted data;

memory means having a parallel address word input coupled to each of said N stages to receive said N bit address and a parallel memory output;

said memory means being addressable so that when said N bit address is applied to said address word input, one of a plurality of unique output words appears at said parallel memory output, said output word being an unique identifier for one of said M outgoing ports to be selected for transmission of said shifted data; and switching means receiving said shifted output and responsive to said parallel memory output for selecting one of said M outgoing ports for transmission of said shifted data.

2. The circuit arrangement of claim 1, further including delay means coupled between said shift register and said switching means for delaying said shifted data by a predetermined amount of time in order to synchronize receipt of said shifted data by said switching means with said selection of one of said outgoing ports.

3. The circuit arrangement of claim 1, further including decoding means for translating the output of said memory means to a one of M decoded signal.

4. The circuit arrangement of claim 1, further including latching means for latching the parallel output of said shift register when said shift register contains said destination address.

5. The circuit arrangement of claim 4, further including a computer coupled to said memory means for changing the information stored in said memory means.

6. The circuit arrangement of claim 5, wherein said switching means includes a local output coupled to said computer so that when said destination address includes a local address, said shifted data is transferred to said computer.

7. The circuit arrangement of claim 6, wherein said computer is operatively coupled to said memory means so that said computer may change the contents of said memory means responsive to said shifted data.

8. A circuit arrangement for providing rapid switching of packets to one of a plurality of output ports wherein said packets contain serial data and an N bit destination address, comprising:

an N bit shift register having a serial input for receiving said packets, a serial output and an N bit parallel output;

latching means coupled to said N bit parallel output for latching said N bit address as it passes through said shift register;

a random access memory having an N bit address coupled to said latches for addressing said memory to produce a memory output;

switching means coupled to said memory and receiving said memory output for selectively coupling one of said output ports to the serial output of said shift register;

a computer coupled to said switching means and said memory so that serial data are sent to said computer when said switching means is appropriately addressed and said memory's contents may be altered in response to said serial data received by said computer.

9. A circuit arrangement for providing rapid switching of packets to one of a plurality of switch outputs wherein said packets contain an N bit destination address, comprising:

an N bit shift register having a serial input for receiving said packets, a serial output and an N bit parallel output;

N latches coupled to said N bit parallel output, for latching said N bit address as it passes through said shift register;

timing means, coupled to said shift register and said latches for detecting the presence of said destination address in said shift register and for directing said N latches to latch said N bit address;

a random access memory receiving said N bit address from said N latches to produce a memory output;

decoding means for decoding said memory output to produce a decoded output;

delay means coupled to said serial output and producing a delayed output therefrom;

switching means, receiving said delayed output and responsive to said decoded output, for directing said delayed output to one of a plurality of switch outputs; and a computer coupled to said random access memory and one of said switch outputs, for altering said memory in response to packets having a predetermined destination address.

* * * * *